United States Patent
Rotter et al.

(10) Patent No.: US 12,458,711 B2
(45) Date of Patent: Nov. 4, 2025

(54) ULTRASONIC IRRIGATOR DEVICE FOR IN-BODY CLEANING AND DISINFECTION

(71) Applicant: SONIDENTAL LTD, Bnei Barak (IL)

(72) Inventors: Shlomo Rotter, Kfar Bilu (IL); Tahel Altman, Ramat Hasharon (IL); Yaniv Lambaz, Tel Aviv (IL)

(73) Assignee: Dimoveo Medical Ltd., Or Yehuda (IL)

( * ) Notice: Subject to any disclaimer, the term of this patent is extended or adjusted under 35 U.S.C. 154(b) by 678 days.

(21) Appl. No.: 17/438,442

(22) PCT Filed: Mar. 12, 2020

(86) PCT No.: PCT/IL2020/050295
§ 371 (c)(1),
(2) Date: Sep. 12, 2021

(87) PCT Pub. No.: WO2020/183472
PCT Pub. Date: Sep. 17, 2020

(65) Prior Publication Data
US 2022/0143296 A1    May 12, 2022

Related U.S. Application Data

(60) Provisional application No. 62/817,782, filed on Mar. 13, 2019.

(51) Int. Cl.
*A61M 1/00* (2006.01)
*A61L 2/00* (2006.01)
*A61M 31/00* (2006.01)

(52) U.S. Cl.
CPC ............ *A61L 2/0011* (2013.01); *A61M 1/774* (2021.05); *A61M 31/00* (2013.01);
(Continued)

(58) Field of Classification Search
CPC .... A61B 2017/22088; A61B 2217/005; A61B 2217/007; A61M 1/774; A61M 2210/086
See application file for complete search history.

(56) References Cited

U.S. PATENT DOCUMENTS

| | | | |
|---|---|---|---|
| 9,795,404 B2 | 10/2017 | Gill et al. | |
| 2020/0188612 A1* | 6/2020 | Brown | ...................... A61L 2/04 |
| 2021/0007759 A1* | 1/2021 | Jiang | ...................... A61B 18/26 |

FOREIGN PATENT DOCUMENTS

WO     2014/099064     6/2014

OTHER PUBLICATIONS

PCT Search Report and Written Opinion PCT/IL2020/050295, Jun. 7, 2020.

* cited by examiner

*Primary Examiner* — Deanna K Hall
(74) *Attorney, Agent, or Firm* — Dekel Patent Ltd.; David Klein

(57) ABSTRACT

Nanoparticles are suspended in a fluid medium which is activated using an ultrasonic transducer in contact with the fluid medium. The fluid may be injected into a body cavity and ultrasonically activated to induce a cavitation effect. The body cavity may contain a natural or artificial hard surface, inflamed or with a biofilm harnessing bacteria, such as a bone, joint or implant, as well as the surrounding tissue. In an embodiment, a treatment device may be used before, during or after a procedure such as a minimally invasive or open surgery to disinfect the body cavity via irrigation with liquid containing suspended nanoparticles and ultrasonically activated. The irrigation device may supply the cavity with the liquid and include therein an ultrasonic transducer. The cleaning and disinfecting process may be performed as treatment of infection in absence of another surgical procedure.

20 Claims, 3 Drawing Sheets

(52) U.S. Cl.
CPC ..... *A61M 2202/04* (2013.01); *A61M 2205/10* (2013.01); *A61M 2210/086* (2013.01)

```
                            START
                              │
                              │ S310
                              ▼
              ┌─────────────────────────────────┐
              │ Surgically insert probe via key-│
              │   hole incision into body       │
              │            cavity               │
              └─────────────────────────────────┘
                              │
                              │ S320
                              ▼
              ┌─────────────────────────────────┐
              │ Activate controller allowing    │
              │ liquid medium to mix with       │
              │         nanoparticles           │
              └─────────────────────────────────┘
                              │
                              │ S330
                              ▼
              ┌─────────────────────────────────┐
              │ Supply liquid medium with       │
              │ suspended nanoparticles to      │
              │         the irrigator           │
              └─────────────────────────────────┘
                              │
                              │ S340
                              ▼
              ┌─────────────────────────────────┐
              │ Supply power to ultrasonic      │
              │         transducer              │
              └─────────────────────────────────┘
                              │
                              │ S350
                              ▼
              ┌─────────────────────────────────┐
              │ Suction liquid and debris back  │
              │ up the irrigator and into       │
              │          waste unit             │
              └─────────────────────────────────┘
                              │
                              │ S360
                              ▼
              ┌─────────────────────────────────┐
              │ Supply liquid medium containing │
              │     antibiotics to the          │
              │           irrigator             │
              └─────────────────────────────────┘
                              │
                              ▼
                             END
```

FIGURE 3

ULTRASONIC IRRIGATOR DEVICE FOR IN-BODY CLEANING AND DISINFECTION

CROSS-REFERENCE TO RELATED APPLICATIONS

This application claims the benefit of U.S. Provisional Application No. 62/817,782 filed on Mar. 13, 2019, the contents of which are hereby incorporated by reference.

TECHNICAL FIELD

The disclosure generally relates to ultrasonic medical devices and particularly to an ultrasonic medical device which uses nanoparticles for cleaning and disinfecting areas of the subject's body

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

Arthroscopy (or arthroscopic or keyhole surgery) is a minimally invasive surgical procedure on a joint in which examination and sometimes treatment of damage is performed using an arthroscope. An arthroscope is an endoscope that is inserted into the joint through a small incision.

The most common cause of joint infection is septic arthritis which can develop when an infection, such as a skin infection or urinary tract infection, spreads through the bloodstream to a joint. Less frequently, a puncture wound, drug injection, or surgery in or near a joint can give the pathogenic germs entry into the joint space. In all these cases there is a need to treat joint infection to prevent further infection in the body.

Irrigation and suction of the joint may be performed before, during or after arthroscopy in order to clean out the area, remove debris, and/or increase visibility of the field. Indeed, it is used as part of treatment of bacterial arthritis.

According to the American Academy of Orthopedic Surgeons, one in every 100 people who have a hip or knee replacement will develop an infection. The treatment for knee replacement infection includes both nonsurgical and surgical procedures. Some knee replacement infections are superficial, which means that the infection has reached the skin and tissue around the joint but does not affect the artificial joint itself and may be treated with oral or intravenous antibiotics. Surgical treatment, if a knee replacement infection goes deeper than the skin and tissue around a joint, include debridement and a surgical washout of the joint. Any contaminated soft tissue is removed surgically, and the artificial joint is cleaned and disinfected. Staged surgery, another option, involves a series of surgeries to remove and replace the artificial joint. This may be necessary if the infection has developed months or years after the original knee replacement. After removal of the artificial joint, joint washout is preformed, which helps get rid of infected soft tissue in the joint.

The antimicrobial, bactericidal and disinfecting effects of various metallic particles such as silver, copper, zinc, and titanium are well known in the art and have been well documented. Nanoparticle carriers may use ultrasonically generated microbubbles as described by Mullin et al., 2013, ("Nanoparticle delivery enhancement with acoustically activated microbubbles." IEEE transactions on ultrasonics, ferroelectrics, and frequency control, 60, 1) as a means of drug delivery which improves their efficacy and increases cellular and vascular permeability.

The sonication of metallic particles has been documented in the art. Pradhan et al., 2016 (Effect of sonication on particle dispersion, administered dose and metal release of non-functionalized, non-inert metal nanoparticles) describes probe sonication of metallic nanoparticles and shows that probe sonication is the preferred method for dispersion and metal release.

Similarly, infections of other permanent or temporary implanted devices such as pacemakers, valves, grafts, etc. pose a problem for the healthcare system. It is therefore evident that improvements on the medical devices and procedures, may increase the level of patient care and be beneficial both medically and financially.

SUMMARY

Certain embodiments disclosed herein include a method for ultrasonically cleaning an internal body part by providing into a cavity of a living body a liquid; providing into the cavity nanoparticles; generating ultrasonic waves in the liquid with the nanoparticles suspended therein for a defined period of time; and removing from the cavity the liquid with the nanoparticles suspended therein, after the defined period of time has lapsed.

Certain embodiments disclosed herein also include an irrigation system for ultrasonic cleansing of an internal body part, which include an irrigator having an ultrasonic transducer, an inlet and an outlet; at least one control unit comprising at least one power supply configured for supplying power at least to the control unit; a liquid supply configured for storing liquid; a nanoparticles supply configured for storing one or more nanoparticle powders; a pump configured for supplying liquid from the liquid supply to a body cavity via the irrigator inlet and/or for extracting liquid from the body cavity; and a control circuitry configured for coupling to one or more of the power supply, the liquid supply, the nanoparticles supply and the pump; wherein the control circuitry and the at least one power supply are further configured for coupling to the ultrasonic transducer, the ultrasonic transducer being configured to contact the liquid.

Certain embodiments of the present disclosure may include some, all, or none of the above advantages. One or more other technical advantages may be readily apparent to those skilled in the art from the figures, descriptions, and claims included herein. Moreover, while specific advantages have been enumerated above, various embodiments may include all, some, or none of the enumerated advantages.

BRIEF DESCRIPTION OF THE DRAWINGS

The foregoing and other objects, features and advantages will become apparent and more readily appreciated from the following detailed description taken in conjunction with the accompanying drawings, in which:

FIG. 3—is a method for providing ultrasonic cleansing and disinfection to a part of the body, implemented in accordance with an embodiment.

DETAILED DESCRIPTION

Figure 1:
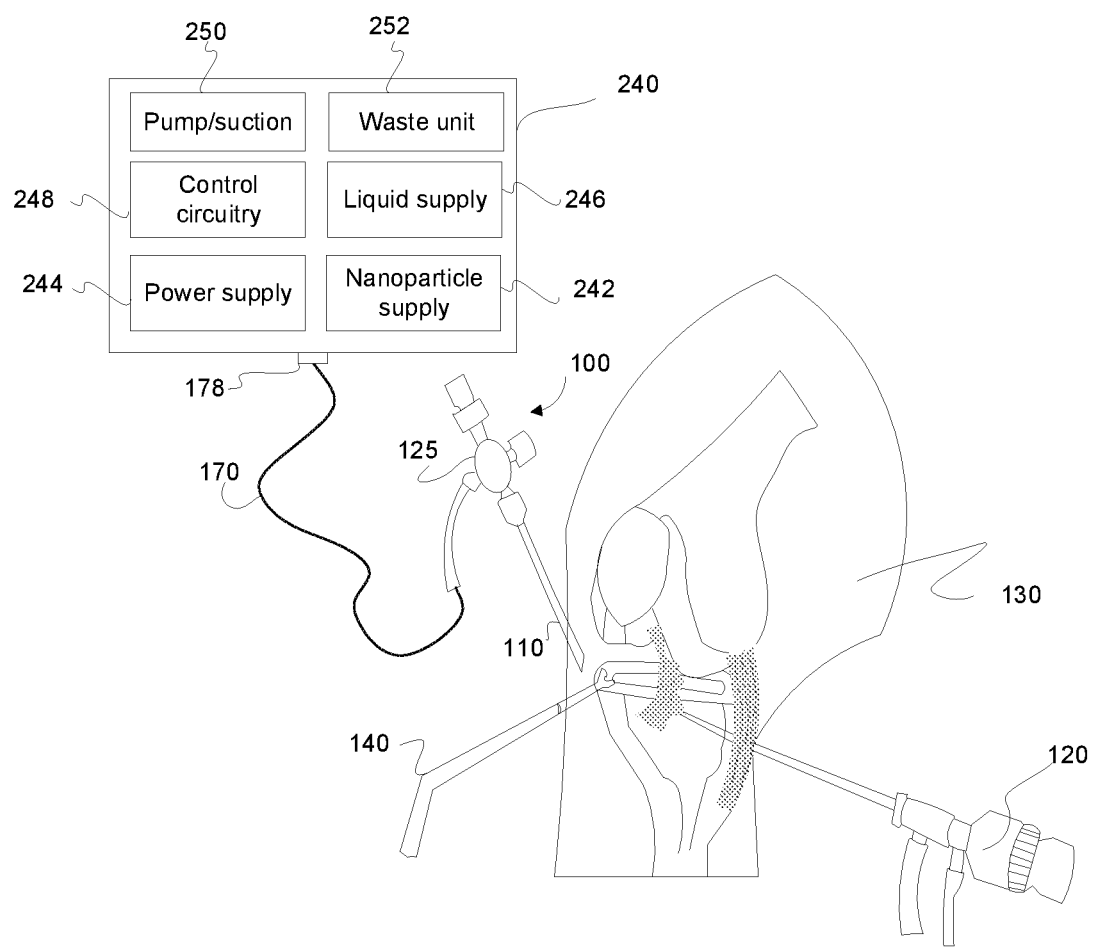
FIG. 1—is an exemplary and non-limiting schematic illustration of an ultrasonic in-body cleansing and disinfecting device, in accordance with an embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

It is important to note that the embodiments disclosed herein are only examples of the many advantageous uses of the innovative teachings herein. In general, statements made in the specification of the present application do not necessarily limit any of the various claims. Moreover, some statements may apply to some features but not to others. In general, unless otherwise indicated, singular elements may be in plural and vice versa with no loss of generality.

Nanoparticles are suspended in a fluid medium which is activated using an ultrasonic transducer in contact with the fluid medium. The fluid medium may include but is not limited to at least one of saline, water, chlorhexidine or any suitable liquid having a pH level substantially at the pH level of the area being treated, so as not to cause a damaging reaction. In an embodiment the fluid medium may be ejected into a body cavity or be directed at a body part at or over a pressure level which is sufficient to remove debris, biofilm, and the like. The fluid composition may also contain other ingredients that can support the cleaning and disinfection action. The body cavity may contain a hard surface such as a bone, joint, an artificial device or naturally occurring buildup of organic material. In an embodiment, an irrigation device may be used before, during or after a procedure such as a minimally invasive or open surgery to clean, clear or disinfect a body area via irrigation with ultrasonically transduced fluid having nanoparticles suspended therein. The irrigation device may supply the cavity with the fluid and include therein an ultrasonic transducer or be applied using separate devices. In other embodiments the cleaning and disinfecting process may be performed as treatment of infection in absence of another surgical procedure. In an embodiment the ultrasonic transducer may be a unidirectional acoustic power source which is redirected to become a semispherical source of acoustic waves.

For the purpose of clearing, cleaning, disinfection and sterilization of a part of the body before, during and/or after surgery, nanoparticles are suspended in a fluid medium which is activated using an ultrasonic transducer in contact with the fluid medium. The fluid is for treating a part of the body, an implanted device or naturally occurring buildup of organic material such as calcified tissue and thrombosis. In some embodiments, the body part is a joint, for example a knee joint, a shoulder joint or a hip joint. In another embodiment, the treated area is a cavity, such as a subcutaneous cavity, in which an implanted device is placed. In certain embodiments, the surgery is a minimally invasive surgery, such as knee arthroscopy. In certain embodiments, the cleaning process itself is carried out as treatment of infection in absence of another surgical procedure. In another embodiment, the process is used in an open surgery to clean and disinfect an inner part of the body. In yet another embodiment, the disclosed process may be used to clean the lumen of vessels or heart valves from thrombosis or calcified lesions by inserting a small ultrasonic transducer, for example via catheterization, in order to generate cavitation in the vicinity of the source. In some embodiments, the fluid may additionally contain antibiotic compositions to aid in disinfection. While references are made to human bodies occasionally throughout this disclosure, this is not intended to be in any way read as a limitation. Similar procedures using the devices disclosed herein can be performed, mutatis mutandis, on other animal life as well. Likewise, it would be evident that the disclosed methods and devices can be used in an open surgery, not only a closed off body cavity.

FIG. 1 is a cross-sectional schematic illustration of an ultrasonic cleaning and disinfecting irrigator 100 used in a knee joint arthroscopic procedure, implemented in accordance with an embodiment. The irrigator 100 includes a surgical probe 110 for insertion into the cavity of a joint 130. In an embodiment the irrigator 100 may be rigid; in other embodiments the irrigator 100 may be flexible. Irrigator flexibility may be achieved by material choice, or a mechanical design which allows flexibility. The joint cavity may be a knee or hip, or any substantially enclosed structure. A multi-channel conduit 170 may couple the irrigator 100 with one or more controllers 240. The conduit 170 may include, for example, a first channel (not shown) for an electric cable and a second channel (not shown) to allow liquid flow. Alternatively, at least two conduits may be used. For example, one conduit may be used for passage of an electric cable and another conduit may be used for fluid/liquid supply. The one or more controllers 240 may include a nanoparticle supply 242, a power supply 244, a liquid supply 246, a control circuitry 248, a pump 250 and a waste unit 252. In some embodiment the nanoparticle supply 242 and liquid supply 246 may be a single supply, such that the nanoparticles are already suspended in the liquid which is delivered into the irrigator device 100 via the conduit 170. Likewise, the liquid may further contain antibiotics therein. In some embodiments, a plurality of liquid supplies and/or nanoparticle supplies may be utilized in any combination, to create different effects. For example, a first liquid may have a first nanoparticle solution, and a second liquid may have an antibiotic solution. The liquids may be supplied alternatively, successively or in combination, to achieve the desired effects. A valve 178 may be opened to allow flow of the liquid from the control unit 240 to the conduit 170. In certain embodiments, the valve may be uni-directional, or bi-directional. The liquid may hold therein a suspension of insoluble nanoparticles. A nanoparticle may be between 1 and 900 nanometers in size. For the purpose of this disclosure, in certain embodiments micron-sized particles may also be used, however they may not have an optimal effect. Exemplary nanoparticles may be metal oxides, metal nitrides and metal carbides. Metal oxides such as Silicon Dioxide, Aluminum dioxide, Magnesium Oxide, Samarium oxide, Titanium Dioxide, and Zinc Oxide. Metal nitrides such as Silicon Nitride and Titanium Nitride. Metal carbides, such as Silicon Carbide, Titanium Carbide, and Tungsten Carbide. In certain embodiments, diamond nanoparticles may be used. In certain embodiments, the ratio between liquid and nanoparticles held in a suspension therein is between 10,000 and 100,000 parts liquid medium to 1 part nanoparticles. In another embodiment the ratio may be between 1,000-1,000,000 parts fluid medium to 1 part nanoparticle. In some embodiments, the nanoparticles may have a morphology which includes one or more sharp shapes. A sharp shape for the purpose of this disclosure is a shape which includes a surface feature that is capable of piercing or otherwise destroying infectious agents (pathogens), such as membrane (cell wall) of a bacterium, or virions. For example, rods (fiber like), or stars are such shapes. The power supply 244 supplies power to various electronic and mechanical elements of the controller 240, such as the pump 250 which is used to regulate flow from the liquid supply 246 through the conduit 170 to the irrigator 100, and an ultrasonic transducer 125 of the irrigator device 100. Control circuitry 248 may be used to regulate the power supply 244, or the nanoparticle supply 242 and liquid supply 246 to change the type of nanoparticles (if various particles are used), the ratio between the liquid and nanoparticles, etc. The control circuitry 248 may be coupled with actuators (not shown), sensors (not shown), and the like. The controller 240 may supply a stream of liquid with suspended nanoparticles via use of a pump 250 to the irrigator 100. The controller 240 may be configured to then initiate the ultrasonic transducer that generates imploding cavitation bubbles creating microjets in the liquid which carry the nanoparticles, resulting in bombarding surfaces of the joint cavity with the nanoparticles. This may result in cleaning and disinfection of the cavity and structures within the cavity by destroying the pathogens by way of membrane disruption. Biofilms can develop and grow on implanted medical devices such as pacemakers, prosthetic heart valves, prosthetic joints and catheters and cause infection. The micro-jets inject the nanoparticles through the surface of the film which may destroy the microorganisms inside. Biofilm disruption also allows further penetration of additional antibiotics if necessary. The irrigator 100 may be used before, after, and during surgical procedures where disinfection is required or may aid in the procedure. Once the treatment is complete, the liquid and any debris may be suctioned back up via the conduit 170 and stored in the waste unit 252. Position and location of the probe 110 in the body cavity (for example joint cavity), can be visualized by the image generated by an endoscope 120. In some embodiments, the liquid may be kept in the body cavity (for example joint cavity) during the surgery to distend the cavity and create a surgical space which is more maneuverable for surgical tools, such as surgical tool 140. In another embodiment, the ultrasonic transduction of the suspended nanoparticles may be carried out via a separate transducer device once the liquid has gathered in the cavity. In some embodiments the fluid may contain one or more additional antibiotic compositions such as vancomycin, gentamycin or fluoroquinolones such as ciprofloxacin in a concentration range of 10 mg-50 mg per liter, and any combination thereof.

Figure 2:
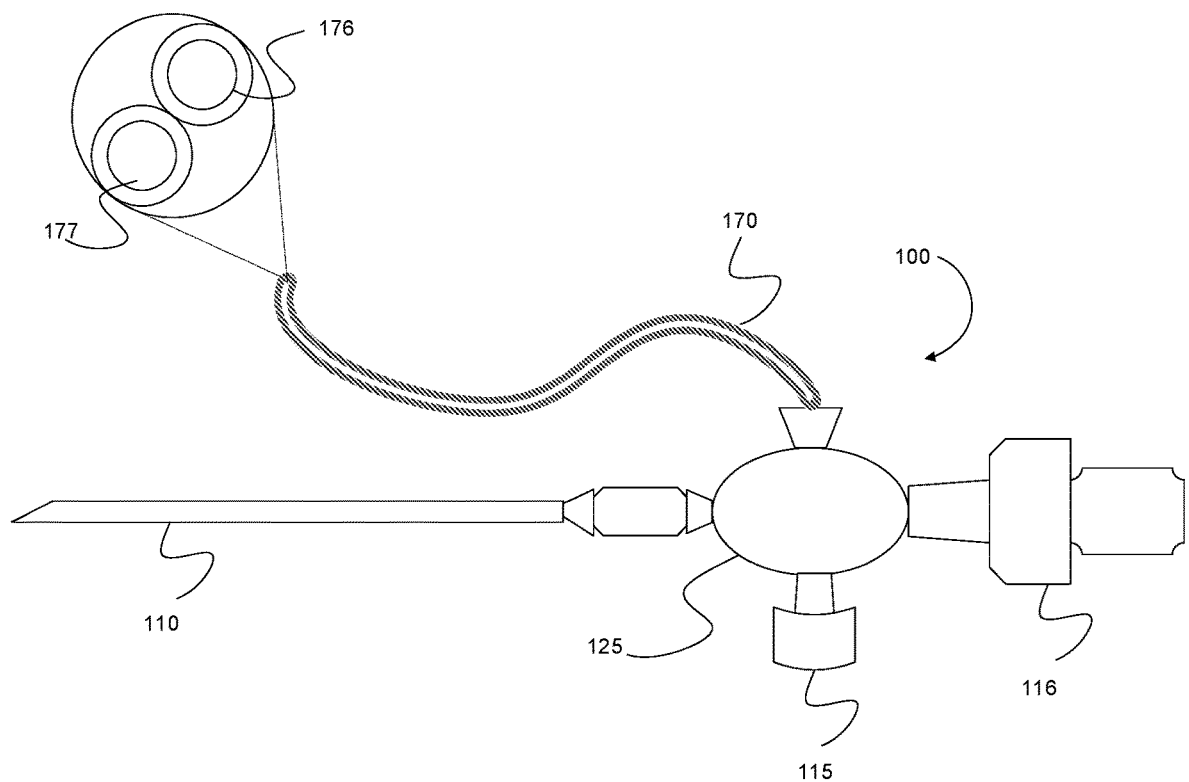
FIG. 2—is a schematic illustration of said device for use to disinfect a body cavity via irrigation with ultrasonically transduced nanoparticles, in accordance with an embodiment.

FIG. 2 is a schematic illustration of the irrigator device 100, implemented in accordance with an embodiment. The device 100 includes a surgical probe 110, a transducer 125, a handle 116, and a valve 115. The transducer 125 is attached to a multi-channel conduit 170 which holds, for example, at least one electrical cable 176 and at least one liquid-carrying tube 177. While this example discussed a multi-channel conduit it would be readily apparent to one skilled in the art that one or more conduits may be utilized to conduct one or more liquid supplies, nanoparticle supplies, or power supplies without departing from the scope of this disclosure. Power to the transducer 125 may be supplied by the controller (discussed in more detail with respect to FIG. 1 above) or by a separate power supply. The valve 115 may allow manual control of the flow of fluid from the device 100 to the probe 110 and into the body cavity (for example, joint cavity), such that an operator of the device 100 can manually control the pressure of fluid expelled from the device. The mechanical handle 116 allows manual control of the device. Using the internal visual image obtained, for example, by way of an endoscope, the probe 110 can be directed to the correct location within the cavity. In some embodiments the transducer 125 may have a portion extending through at least a portion of the probe 110 to activate the nanoparticles closer to the cavity. In some embodiments, the irrigator device 100 may be operative to release fluid from the probe 110 at a high pressure, creating a fluid jet having kinetic energy which may assist in removing debris by transferring kinetic energy from the fluid jet to a treated surface upon impact. For example, the probe 110 may taper towards an outlet from which fluid is ejected, such that the taper would create a pressure difference. Such an irrigator device is discussed in more detail in PCT application PCT/IL2020/050009 (which claims benefit from U.S. Provisional Patent Application 62/787,910) entitled "An Ultrasonic Oral Cleaning Device", having at least one joint inventor, the contents of which are incorporated by reference herein.

FIG. 3 is flowchart of an exemplary method for providing ultrasonic cleansing and disinfection to an internal part of the body using an ultrasonic irrigator device, implemented in accordance with an embodiment.

At S310 a surgical probe of an irrigator device is inserted into a specific cavity via key-hole incision. The cavity may be of a knee joint, shoulder joint, elbow joint, wrist joint, ankle joint, or hip joint. While other joints are certainly possible, these are listed here as the most common type to undergo an arthroscopic procedure. In certain embodiments, other body cavities or organs may be treated, such as arteries. The cavity should be able to hold within an amount of liquid with nanoparticle suspension. It can be appreciated, that the insertion via keyhole incision of S310 is unnecessary when the ultrasonic cleansing method is executed during open surgery.

At optional S320 a controller coupled with the irrigator causes the liquid medium to mix with the nanoparticles, for example by manipulating one or more actuators. In another embodiment the liquid and the nanoparticles are pre-mixed in a prepared solution. In yet another embodiment the liquid and nanoparticles are supplied into the treated area.

At S330 the liquid medium with suspended nanoparticles is supplied to the irrigator via a conduit by way of a pump. In one embodiment, the liquid and the nanoparticles are supplied to the irrigator separately and mixed in the irrigator. In a further embodiment, the liquid and the nanoparticles are supplied separately into the cavity, such that the combining occurs only within the cavity. The pump may be switched on manually via the controller. In an embodiment, the liquid medium can only travel through the conduit when a valve of the controller is in an open state.

At S340 power is supplied to the ultrasonic transducer by way of the controller or a separate power supply. In some embodiments, the ultrasonic transducer is contained within the irrigator. The transducer generates ultrasonic waves, generating imploding cavities in the fluid which cause the nanoparticles to bombard surfaces within the treated body cavity. The irrigator may contain a valve which allows control of flow of ultrasonically transduced nanoparticles suspended in liquid to the cavity. In another embodiment the transducer may be a separate device which is inserted through a separate surgical incision (unless the surgery is open surgery) and generates ultrasonic waves from within the body cavity. Surfaces of the cavity are bombarded with nanoparticles suspended in the liquid. In certain embodiments, the liquid medium may be provided at a regulated flow and pressure. In some embodiments, the irrigator may supply a first liquid with a first nanoparticle suspension, and then supply a second liquid with a second nanoparticle suspension. The first and second suspensions may differ in nanoparticle type, nanoparticle size, ratio of nanoparticles to liquid, liquid type, liquid viscosity, combinations thereof, and the like. The imploding cavities and resulting bombarding nanoparticles will clean, and disinfect the joint as the bacteria and pathogens that come into contact with the nanoparticles in the liquid will experience disruption of the membrane of the pathogen thus inhibiting function. In some embodiments the fluid may contain one or more additional antibiotic compositions such as vancomycin, gentamycin or fluoroquinolones such as ciprofloxacin, in a concentration range of 10 mg-50 mg per liter, or any combination thereof.

At S350 suction of the liquid medium is performed, once it has been in contact with the cavity for a set amount of time. The time frame may be dependent on considerations such as the location of the cavity, the type of infection and/or the level of infection. On conclusion of cleaning the remaining liquid and any debris is suctioned back up through the probe, into the irrigator and into a waste unit by way of the pump and power supply. In another embodiment the waste unit is separate from the control unit. In another embodiment, suction may be performed by a separate suction device, which is distinct from the irrigator device. In some embodiments, the liquid may remain in the joint for the duration of the surgery, to provide joint distention. In other embodiments, suction may be performed after cleaning/disinfecting, then a second liquid may be supplied, with or without nanoparticles to distend the joint. Surgery is then performed, after which an additional activation may be performed, and finally a suction to remove all nanoparticle suspended liquid from the joint.

At optional S360 a fluid medium containing one or more antibiotic compositions such as vancomycin, gentamycin or fluoroquinolones such as ciprofloxacin in a concentration range of 10 mg-50 mg per liter, or any combination thereof, supplied to the irrigator via a conduit by way of a pump. The pump may be switched on manually via the controller. In some embodiments, steps S320 through S350 may be performed multiple times. In certain embodiments, steps S320 through S360 may be performed multiple times, so that a first set of steps S320 through S350 are performed, with step S360 being performed before or after each set of steps.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. No feature described in the context of an embodiment is to be considered an essential feature of that embodiment, unless explicitly specified as such.

Although steps of methods according to some embodiments may be described in a specific sequence, methods of the disclosure may include some or all of the described steps carried out in a different order. The methods of the disclosure may include a few of the steps described or all of the steps described. No particular step in a disclosed method is to be considered an essential step of that method, unless explicitly specified as such.

The phraseology and terminology employed herein are for descriptive purpose and should not be regarded as limiting. Citation or identification of any reference in this application shall not be construed as an admission that such reference is available as prior art to the disclosure. Section headings are used herein to ease understanding of the specification and should not be construed as necessarily limiting.

The invention claimed is:

1. A method for ultrasonically cleaning an internal body part comprising:
providing into a cavity of a living body a liquid;
providing into the cavity nanoparticles which have a morphology which includes one or more sharp shapes capable of piercing infectious agents;
generating ultrasonic waves in the liquid with the nanoparticles suspended therein for a defined period of time, wherein said ultrasonic waves are used to generate imploding cavitation bubbles, creating micro-jets in said liquid when said nanoparticles are suspended therein, resulting in bombarding surfaces of said internal body part with said nanoparticles to clean and disinfect said surfaces of said internal body part; and
removing from the cavity the liquid with the nanoparticles suspended therein, after the defined period of time has lapsed.

2. The method of claim 1 wherein the cavity is a joint cavity.

3. The method of claim 2, wherein the liquid is provided to the cavity via a device a portion of which is inserted into the cavity via minimally invasive surgery.

4. The method of claim 3 wherein the liquid and the nanoparticles are combined in a solution.

5. The method of claim 4 wherein the device comprises: an irrigation device; at least one control unit configured for coupling to the irrigation device; and a probe configured for coupling to the irrigation device and for insertion into the cavity.

6. The method of claim 5, wherein the at least one control unit comprises one or more of: a power supply configured for supplying power to the at least one controller; a liquid supply configured for storing liquid; a nanoparticles supply configured for storing one or more nanoparticle powders; a pump configured for supplying liquid from the liquid supply to the irrigation device and/or for extracting liquid from the cavity; a control circuitry configured for coupling to one or more of the power supply, the liquid supply, the nanoparticles supply and the pump; and a waste unit configured for coupling to the irrigation device and to the pump, and further configured for storing liquid extracted from the cavity.

7. The method of claim 6, wherein the irrigation device comprises: one or more conduits configured for coupling to the control unit and comprising a first channel configured for connecting to the liquid supply and a second channel configured for connecting to the power supply; a multi-directional valve configured to control the flow of liquid from the liquid supply; and a transducer configured for generating ultrasonic waves.

8. The method of claim 7, wherein the one or more conduits comprise a multi-channeled conduit.

9. The method of claim 6, wherein the liquid supply is further configured to contain an antibiotic composition.

10. The method of claim 9, wherein the antibiotic composition comprises one or more of: vancomycin, gentamycin or ciprofloxacin.

11. The method of claim 10, wherein the probe is configured for insertion into the cavity via a small surgical incision.

12. The method of claim 6, further comprising initiating mixing of the liquid from the liquid supply and the nanoparticles from the nanoparticle supply.

13. The method of claim 6, further comprising initiating operation of the pump to enable the liquid to flow from the liquid supply into the cavity via the irrigation device and the probe.

14. The method of claim 3, wherein the minimally-invasive surgery is an arthroscopic knee surgery.

15. The method of claim 1, wherein the defined period of time includes time to perform a surgical procedure, and the method further includes keeping the liquid in the cavity during the surgical procedure to distend the cavity and create a larger space to perform the surgical procedure, and the method further includes controlling a total time the liquid stays in the cavity during the surgical procedure and controlling time to empty the cavity from the liquid.

16. An irrigation system for ultrasonic cleansing of an internal body part, comprising:
- an irrigator comprising: an ultrasonic transducer, an inlet and an outlet;
- at least one control unit comprising: at least one power supply configured for supplying power at least to the control unit;
- a liquid supply configured for storing liquid;
- a nanoparticles supply configured for storing one or more nanoparticles which have a morphology which includes one or more sharp shapes capable of piercing infectious agents;
- a pump configured for supplying liquid from the liquid supply to a body cavity via the irrigator inlet, and/or for supplying said one or more nanoparticles from said nanoparticles supply, and/or for extracting at least one of liquid and said nanoparticles from the body cavity; and
- a control circuitry configured for coupling to one or more of: the power supply, the liquid supply, the nanoparticles supply and the pump; wherein the control circuitry and the at least one power supply are further configured for coupling to the ultrasonic transducer, the ultrasonic transducer being configured to contact the liquid; and wherein said control circuitry is configured to cause said ultrasonic transducer to generate imploding cavitation bubbles, creating micro-jets in said liquid when said nanoparticles are suspended therein, resulting in bombarding surfaces of said internal body part with said nanoparticles to clean and disinfect said surfaces of said internal body part.

17. The irrigation system of claim 16, further comprising: one or more conduits configured for coupling to the control unit and comprising a first channel configured for connecting to the liquid supply and a second channel configured for connecting to the power supply, wherein the one or more conduits are coupled to the inlet of the irrigator.

18. The irrigation system of claim 16, wherein the one or more conduits comprise a multi-channeled conduit.

19. The irrigation system of claim 16, wherein at least one of the following is being held true (a) said system further comprising a multi-directional valve configured to control the flow of liquid from the liquid supply; (b) wherein the irrigator outlet is configured for attachment to a probe, the probe being configured for insertion into the body cavity; (c) the control circuitry is configured to initiate operation of the pump to enable liquid to flow from the liquid supply into the body cavity via the irrigation device and the probe; (d) the control circuitry is configured to initiate mixing of liquid from the liquid supply and nanoparticles from the nanoparticles supply; (e) the irrigator further comprises a frequency tracking controller configured to maintain the ultrasonic transducer at resonant frequency; and any combination thereof.

20. The irrigation system of claim 16, wherein at least one of the following is being held true (a) said system further comprising a waste unit configured for coupling to the pump, and further configured for storing liquid extracted from the body cavity; (b) the liquid supply is further configured to contain an antibiotic composition; (c) the antibiotic composition comprises one or more of: vancomycin, gentamycin and ciprofloxacin; and any combination thereof.

* * * * *